(12) United States Patent
Nagase et al.

(10) Patent No.: US 11,947,147 B2
(45) Date of Patent: Apr. 2, 2024

(54) OPTICAL DEVICE WITH MICROCRACK RESISTANCE FROM SURFACE ROUGHNESS THEREBY REDUCING LOSS OF LIGHT

(71) Applicant: TDK CORPORATION, Tokyo (JP)

(72) Inventors: Kenji Nagase, Hong Kong (CN); Hiroshi Take, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/707,055

(22) Filed: Mar. 29, 2022

(65) Prior Publication Data

US 2022/0317358 A1 Oct. 6, 2022

(30) Foreign Application Priority Data

Mar. 30, 2021 (CN) .......................... 202110340372.9
Mar. 28, 2022 (CN) .......................... 202210309674.4

(51) Int. Cl.
*F21V 8/00* (2006.01)
(52) U.S. Cl.
CPC ......... *G02B 6/0016* (2013.01); *G02B 6/0065* (2013.01); *G02B 6/0093* (2013.01)
(58) Field of Classification Search
CPC .. G02B 6/0016; G02B 6/0065; G02B 6/0093; G02B 2006/12038; G02B 2006/1204; G02B 2006/12097; G02B 2006/12142; G02F 1/035; G02F 1/212
See application file for complete search history.

(56) References Cited

U.S. PATENT DOCUMENTS

| 4,763,972 A | * | 8/1988 | Papuchon | ............... | G02B 6/105 |
| | | | | | 385/11 |
| 5,129,017 A | | 7/1992 | Kawano et al. | | |
| 5,337,375 A | * | 8/1994 | Nyman | ................ | G01M 11/333 |
| | | | | | 385/11 |
| 5,339,190 A | * | 8/1994 | Yamamoto | ............ | G02F 1/3775 |
| | | | | | 359/332 |
| 5,428,695 A | * | 6/1995 | Ohta | ................... | G02B 6/29329 |
| | | | | | 385/11 |
| RE35,697 E | * | 12/1997 | Grasso | ............... | H04B 10/2912 |
| | | | | | 398/40 |
| 6,324,332 B1 | * | 11/2001 | Yamashita | ......... | B29D 11/0075 |
| | | | | | 65/102 |
| 6,532,324 B2 | | 3/2003 | Lupu et al. | | |

(Continued)

FOREIGN PATENT DOCUMENTS

JP S64-048021 A 2/1989
JP H08-016746 B2 2/1996
(Continued)

*Primary Examiner* — Andrew Jordan
(74) *Attorney, Agent, or Firm* — Oliff PLC

(57) ABSTRACT

An optical device including: a substrate; an optical waveguide formed at the substrate; and a protective layer formed adjacent to the optical waveguide, wherein the optical waveguide includes multiple side surfaces that intersect the substrate, at least one side surface of the optical waveguide is provided with a rough surface. According to the optical device of the present invention, the light propagation loss can be reduced.

13 Claims, 4 Drawing Sheets

(56) References Cited

U.S. PATENT DOCUMENTS

| | | | |
|---|---|---|---|
| 6,711,193 B2* | 3/2004 | Yamasaki | H01S 5/32341 |
| | | | 372/45.01 |
| 7,509,003 B2* | 3/2009 | Sugiyama | G02F 1/225 |
| | | | 385/32 |
| 8,582,927 B1 | 11/2013 | Thaniyavarn | |
| 9,939,709 B2* | 4/2018 | Iwatsuka | G02B 6/122 |
| 9,946,100 B2 | 4/2018 | Yanagawa et al. | |
| 10,168,495 B1* | 1/2019 | Sagara | G02B 6/122 |
| 10,203,583 B2* | 2/2019 | Iwatsuka | G02B 6/126 |
| 10,359,684 B2* | 7/2019 | Iwatsuka | G02B 6/126 |
| 10,921,517 B2* | 2/2021 | Ogawa | G02F 1/2257 |
| 10,955,722 B2* | 3/2021 | Iwatsuka | G02F 1/225 |
| 10,955,723 B2* | 3/2021 | Sugiyama | G02F 1/2257 |
| 11,086,149 B2* | 8/2021 | Iwatsuka | G02F 1/225 |
| 11,378,828 B2* | 7/2022 | Takano | G02F 1/035 |
| 11,460,751 B2* | 10/2022 | Umemoto | G02F 1/0316 |
| 2002/0105986 A1* | 8/2002 | Yamasaki | H01S 5/32341 |
| | | | 372/45.01 |
| 2002/0106141 A1 | 8/2002 | Gopalakrishnan | |
| 2003/0012540 A1* | 1/2003 | Kato | B23K 26/364 |
| | | | 359/326 |
| 2004/0028334 A1 | 2/2004 | Marazzi et al. | |
| 2004/0090899 A1* | 5/2004 | Gladney | G11B 7/1275 |
| 2007/0297720 A1* | 12/2007 | Sugiyama | G02B 6/1223 |
| | | | 385/32 |
| 2017/0052424 A1* | 2/2017 | Iwatsuka | G02B 6/122 |
| 2018/0188629 A1* | 7/2018 | Iwatsuka | G02B 6/126 |
| 2019/0004248 A1* | 1/2019 | Sagara | G02B 6/4214 |
| 2019/0079366 A1* | 3/2019 | Iwatsuka | G02B 6/122 |
| 2019/0146302 A1* | 5/2019 | Iwatsuka | G02F 1/035 |
| | | | 385/2 |
| 2019/0271896 A1* | 9/2019 | Sugiyama | G02F 1/218 |
| 2020/0064548 A1* | 2/2020 | Ogawa | G02B 6/12007 |
| 2020/0174337 A1* | 6/2020 | Iwatsuka | G02F 1/225 |
| 2020/0218126 A1 | 7/2020 | Iwatsuka et al. | |
| 2020/0310170 A1 | 10/2020 | Iwatsuka et al. | |
| 2020/0310216 A1* | 10/2020 | Iwatsuka | G02F 1/2255 |
| 2021/0096441 A1* | 4/2021 | Umemoto | G02F 1/2257 |
| 2021/0103165 A1* | 4/2021 | Iwatsuka | G02F 1/0356 |
| 2021/0266066 A1* | 8/2021 | Bois | H04B 10/07957 |
| 2021/0302764 A1* | 9/2021 | Takano | G02B 6/1228 |
| 2021/0325761 A1* | 10/2021 | Makino | G02B 6/0065 |
| 2022/0252913 A1* | 8/2022 | Lo | G02F 1/035 |
| 2022/0260779 A1* | 8/2022 | Yang | G02B 6/1228 |
| 2022/0260864 A1* | 8/2022 | Delisle-Simard | G02F 1/025 |
| 2022/0270930 A1* | 8/2022 | Sreenivasan | H01L 21/823807 |
| 2022/0291532 A1* | 9/2022 | Chen | G02F 1/035 |
| 2022/0308286 A1* | 9/2022 | Nakata | G02F 1/0356 |
| 2022/0308418 A1* | 9/2022 | Kataoka | G02F 1/2255 |
| 2022/0317358 A1* | 10/2022 | Nagase | G02B 6/0016 |
| 2022/0317371 A1* | 10/2022 | Nagase | G02F 1/0356 |
| 2022/0326554 A1* | 10/2022 | Take | G02F 1/225 |
| 2022/0326555 A1* | 10/2022 | Take | G02F 1/035 |
| 2022/0390693 A1* | 12/2022 | Krähenbühl | G02B 6/30 |
| 2023/0025577 A1* | 1/2023 | Scullion | B01L 3/502715 |
| 2023/0036811 A1* | 2/2023 | Nagase | G02F 1/2255 |
| 2023/0112785 A1* | 4/2023 | Nagase | G02F 1/0316 |
| | | | 385/2 |
| 2023/0314852 A1* | 10/2023 | Nagase | G02F 1/035 |
| | | | 385/2 |

FOREIGN PATENT DOCUMENTS

| | | |
|---|---|---|
| JP | 3149088 B2 | 3/2001 |
| JP | 2004-226471 A | 8/2004 |
| JP | 2006-195383 A | 7/2006 |
| JP | 2006-317550 A | 11/2006 |
| JP | 2007-199500 A | 8/2007 |
| JP | 4485218 B2 | 6/2010 |
| JP | 2012-078375 A | 4/2012 |
| JP | 2014-142411 A | 8/2014 |
| JP | 2015-014715 A | 1/2015 |
| JP | 5853880 B2 | 2/2016 |
| JP | 2019-074595 A | 5/2019 |
| WO | 2019/039215 A1 | 2/2019 |
| WO | 2019/069815 A1 | 4/2019 |

* cited by examiner

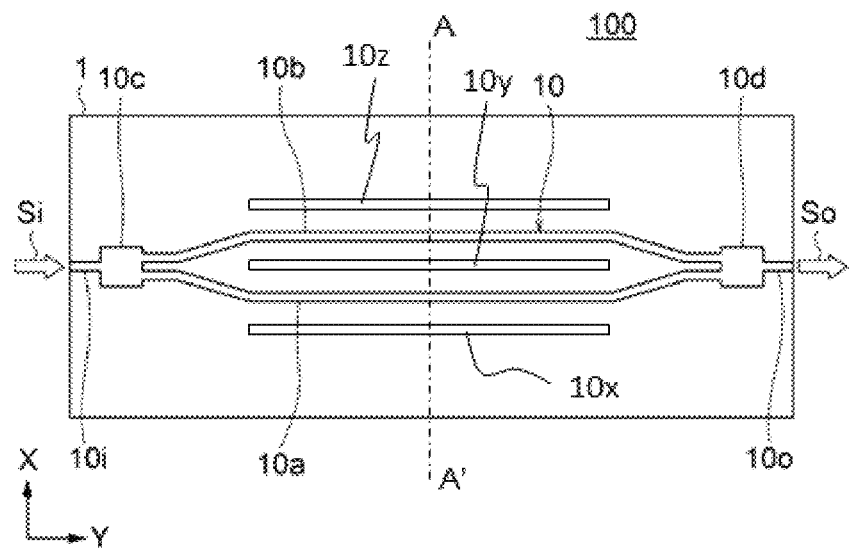
FIG. 1 ( a )
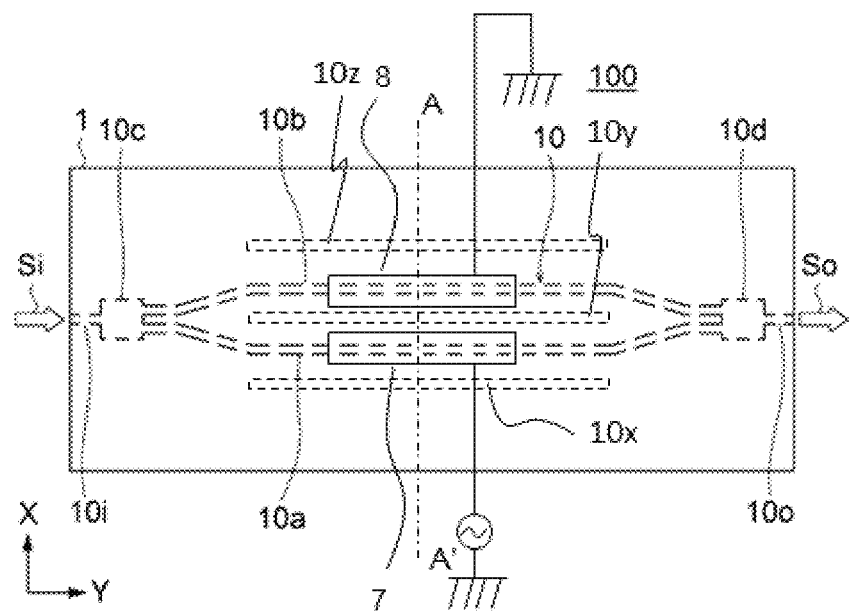
FIG. 1 ( b )

OPTICAL DEVICE WITH MICROCRACK RESISTANCE FROM SURFACE ROUGHNESS THEREBY REDUCING LOSS OF LIGHT

FIELD

The present invention relates to an optical device used in the fields of optical communication and optical measurement.

BACKGROUND

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a method for converting an electric signal into an optical signal, there are known a direct modulation method using a semiconductor laser and an external modulation method using an optical modulator. The direct modulation method does not require the optical modulator and is thus low in cost, but has a limitation in terms of high-speed modulation and, thus, the external modulation method is used for high-speed and long-distance applications.

As the optical modulator, a Mach-Zehnder optical modulator in which an optical waveguide is formed by Ti (titanium) diffusion in the vicinity of the surface of a single-crystal lithium niobate substrate has been practically used (see, Patent Document 1). The Mach-Zehnder optical modulator is an optical modulator that uses an optical waveguide (Mach-Zehnder optical waveguide) having a Mach-Zehnder interferometer structure. The Mach-Zehnder interferometer is a device that separates light emitted from one light source into two beams, makes the two beams pass through different paths, and then recombines the two beams to cause interference, and the Mach-Zehnder optical modulator applying the Mach-Zehnder interferometer is used for generating various modulated lights. Although high-speed optical modulators having a modulation speed of 40 Gb/s or more are commercially available, they have a major drawback that the entire length thereof is as long as about 10 cm.

In contrast, Patent Document 2 discloses a Mach-Zehnder optical modulator using a lithium niobate film. The optical modulator using the lithium niobate film (LN film) achieves significant reduction in size and driving voltage as compared with an optical modulator using the lithium niobate single-crystal substrate. In Patent Document 2, the step of forming the LN film at the substrate and the step of etching the LN thin film and forming the optical waveguide at the substrate provide sufficient light confinement. Thus, the operation of electro-optical devices has high speed.

In the optical waveguide using the LN film, it is important to confine the entry of light so as to reduce the driving voltage. Thus, the LN film quality and the clinginess to the protective layer must be emphasized to avoid the generation of micro-cracks on the LN film. For example, silicon oxide with a low refractive index as the protective layer is formed adjacent to the LN film as the optical waveguide. Thereby, the influence of stress caused by the different coefficients of expansion between the LN film and the material constituting the protective layer may cause the light propagation loss.

The present invention has been completed in view of the above problems, and its object is to provide an optical device with a small light propagation loss. By roughening at least one side surface of the optical waveguide, the influence of stress caused by the different coefficients of expansion between lithium niobate and silicon oxide is reduced, thereby the breakage of the optical waveguide and the generation of micro-cracks are prevented and the light propagation loss is reduced.

CITATION LIST

Patent Document

Patent Document 1: JP 2005-221874A
Patent Document 2: JP 2006-195383A

SUMMARY

The present invention is completed in view of the above problems, and its object is to provide an optical device with a small light propagation loss.

The optical device of an embodiment of the present invention comprises: a substrate; an optical waveguide formed at the substrate; and a protective layer formed adjacent to the optical waveguide, wherein the optical waveguide comprises multiple side surfaces that intersect the substrate, at least one side surface of the optical waveguide is provided with a rough surface.

According to the optical device of the present invention, it is arranged adjacent to the lithium niobate as the waveguide. The influence of stress caused by the difference of expansion coefficients between the protective layer composed of silicon oxide with a low refractive index is provided adjacent to the optical waveguide composed of lithium niobate, which leads to the light propagation loss. However, making the surface of the optical waveguide have predetermined rough surfaces can avoid this influence and suppress the deterioration of the propagation loss.

In addition, in the optical device of the present invention, preferably, the maximum value of the roughness of the rough surface Rmax is 8.6 to 55 nm.

In addition, in the optical device of the present invention, preferably, the maximum value of the roughness of the rough surface Rmax is 17 to 40 nm.

In addition, in the optical device of the present invention, preferably, in the rough surface, there are 2 or more peaks in a field of view of 1.5 μm×0.2 μm.

In addition, in the optical device of the present invention, preferably, the rough surface is provided with ribs in a direction intersecting the substrate.

In addition, in the optical device of the present invention, preferably, the ribs are longitudinal ribs.

In addition, in the optical device of the present invention, preferably, the optical waveguide is a film composed of $LiNbO_3$ or $LiTaO_3$.

In addition, in the optical device of the present invention, preferably, the optical waveguide is a film in which $LiNbO_3$ is doped with at least one element selected from Ti, Mg, Zn, In, Sc, Er, Tm, Yb, and Lu.

In addition, in the optical device of the present invention, preferably, the optical waveguide is an epitaxial film.

In addition, in the optical device of the present invention, preferably, the epitaxial film is oriented in a direction intersecting the substrate.

The optical modulator of another embodiment of the present invention comprises: a substrate; an optical waveguide formed at the substrate; a protective layer formed adjacent to the optical waveguide; and an electrode formed at the optical waveguide via the protective layer, wherein the optical waveguide comprises multiple side surfaces that intersect the substrate, at least one side surface of the optical waveguide is provided with a rough surface.

Advantageous Effects of the Invention

According to the optical device and the optical modulator provided with the optical device of the present invention, the light propagation loss can be effectively reduced.

BRIEF DESCRIPTION OF THE DRAWINGS

FIG. 1(a) and FIG. 1(b) are top views of the optical modulator 100 according to the first embodiment of the present invention, in which FIG. 1(a) only illustrates the optical waveguide, and FIG. 1(b) illustrates the entire configuration of the optical modulator 100 including traveling wave electrodes.

DETAILED DESCRIPTION OF THE EMBODIMENT(S)

Figure 2:
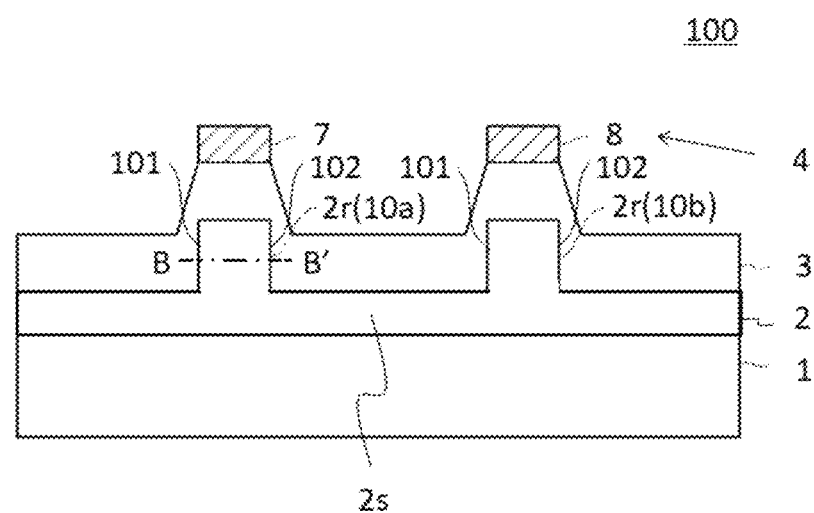
FIG. 2 is an illustrative cross-sectional view of the optical modulator 100 taken along line A-A' of FIG. 1(a) and FIG. 1(b).

Hereinafter, embodiments of the present invention will be described in detail with reference to the accompanying drawings.

FIG. 1(a) and FIG. 1(b) are top views of the optical modulator 100 according to the first embodiment of the present invention, in which FIG. 1(a) only illustrates the optical waveguide, and FIG. 1(b) illustrates the entire configuration of the optical modulator 100 including traveling wave electrodes.

As illustrated in FIG. 1(a) and FIG. 1(b), the optical modulator 100 comprises: a Mach-Zehnder optical waveguide 10, first and second optical waveguides 10a and 10b formed at the substrate 1 and provided in parallel to each other; a first electrode 7 provided along the first optical waveguide 10a; and a second electrode 8 provided along the second optical waveguide 10b.

The Mach-Zehnder optical waveguide 10 is an optical waveguide having a structure of Mach-Zehnder interferometer. There are the first and the second optical waveguides 10a and 10b branched from one input optical waveguide 10i at a demultiplexing section 10c, and the first and the second optical waveguides 10a and 10b are combined into one output optical waveguide 10o at a multiplexing section 10d. After the input light Si is demultiplexed at the demultiplexing section 10c and travels through the first and the second optical waveguides 10a and 10b, respectively, it is multiplexed at the multiplexing section 10d and output from the output optical waveguide 10o as modulation light So.

The first electrode 7 covers the first optical waveguide 10a in the top view, and the second electrode 8 covers the second optical waveguide 10b in the top view at the same time. In other words, the first electrode 7 is formed at the first optical waveguide 10a via the protective layer (it will be described later), and the second electrode 8 is formed at the second optical waveguide 10b via the protective layer. The first electrode 7 is connected to, for example, an AC signal, and it can be referred to as a "jump" electrode. The second electrode 8 is connected to, for example, the ground, and it can be referred to as a "ground" electrode.

The electric signal (the modulation signal) is input to the first electrode 7. Since the first optical waveguide 10a is composed of materials with electro-optical effects such as lithium niobate etc., according to the electric field imparted to the first optical waveguide 10a, the refractive index of the first optical waveguide 10a changes as +Δn and −Δn, and the phase difference between a pair of optical waveguides changes. The signal light modulated by the change of the phase difference is output from the output optical waveguide 10o.

In addition, in the region other than the region (the predetermined region) where the first and second optical waveguides 10a and 10b are provided, non-light-propagation optical waveguides 10x, 10y and 10z formed on the substrate 1 are provided. Herein, the non-light-propagation optical waveguides 10x, 10y and 10z can be optical waveguides that do not propagate light in actual work. That is, there is no need to provide the electrode to which the electric field is applied on the non-light-propagation optical waveguides 10x, 10y and 10z. When viewing the substrate 1 from above, the non-light-propagation optical waveguides 10x, 10y and 10z, for example, are arranged along the straight line portion of the first and second optical waveguides 10a and 10b, and a plurality of (three) optical waveguides are provided. Specifically, the non-light-propagation optical waveguide 10y is interposed between the first and second optical waveguides 10a and 10b. The non-light-propagation optical waveguides 10x and 10y are provided by interposing the first optical waveguide 10a between them. The non-light-propagation optical waveguides 10y and 10z are provided by interposing the second optical waveguide 10b between them. The non-light-propagation optical waveguides 10x, 10y and 10z can all extend along the extending direction of the first and second optical waveguides 10a and 10b. However, the optical modulator 100 of the present embodiment does not necessarily have to include a non-light-propagation optical waveguide, and can be provided as a structure that includes only the Mach-Zehnder optical waveguide 10 and does not include a non-light-propagation optical waveguide.

FIG. 2 is an illustrative cross-sectional view of the optical modulator 100 taken along line A-A' of FIG. 1(a) and FIG. 1(b).

As illustrated in FIG. 2, the optical modulator 100 of the present embodiment is provided with a multilayer structure in which a substrate 1, an optical waveguide 2, a protective layer 3 and an electrode layer 4 are laminated in this order. The substrate 1 is, for example, a sapphire substrate, and the optical waveguide 2 formed of the lithium niobate film at the substrate 1. The optical waveguide 2 is provided with the first and second optical waveguides 10a and 10b composed of a flat plate portion 2s and a ridge portion 2r raised on the flat plate portion 2s.

To prevent the light propagating through the first and second optical waveguides 10a and 10b from being absorbed by the first electrode 7 or the second electrode 8, the protective layer 3 is formed adjacent to the optical waveguide 2 (the first and second optical waveguides 10a and 10b), and it is at least formed on the upper surfaces of the ridge portion 2r of the optical waveguide 2. Thus, the protective layer 3 only needs to function as an intermediate layer between the optical waveguide and the signal electrode, and the material of the protective layer 3 can be widely selected. For example, the protective layer 3 can be made of a non-metal oxide such as silicon oxide, a metal oxide such as alumina, a metal nitride, a metal carbide, a resin material such as polyimide, or an insulating material such as ceramics. The material of the protective layer 3 can be a crystalline material or an amorphous material. The protective layer 3 is preferably formed of a material with a lower refractive index than the optical waveguide 2, such as, $Al_2O_3$, $SiO_2$, $LaAlO_3$, $LaYO_3$, ZnO, $HfO_2$, MgO, $Y_2O_3$ etc. can be used.

The electrode layer 4 is provided with the first electrode 7 and the second electrode 8. The first electrode 7 is at least opposite to the first optical waveguide 10a via the protective layer 3 and is arranged to overlap the ridge portion 2r corresponding to the first optical waveguide 10a, so as to modulate the light traveling in the first optical waveguide. The second electrode 8 is at least opposite to the second optical waveguide 10b via the protective layer 3 and is arranged to overlap the ridge portion 2r corresponding to the second optical waveguide 10b, so as to modulate the light traveling in the second optical waveguide.

The optical waveguide 2 is not particularly limited as long as it is formed of electro-optical materials, thus the film constituting the optical waveguide 2 may also be referred to as an electro-optical material film. However, the optical waveguide 2 is preferably composed of lithium niobate ($LiNbO_3$). This is because lithium niobate has a large electro-optical constant and is suitable as a constituent material of optical devices such as optical modulators. The optical waveguide 2 may also be composed of lithium tantalate ($LiTaO_3$). In addition, when the optical waveguide 2 is composed of lithium niobate, other elements may also be doped, for example, lithium niobate may be doped with at least one selected from Ti, Mg, Zn, In, Sc, Er, Tm, Yb, and Lu. At least one of Yb and Lu. Hereinafter, the structure of the present embodiment when the optical waveguide 2 is a lithium niobate film is described in detail.

The substrate 1 is not particularly limited as long as it has a lower refractive index than the lithium niobate film, but it is preferable a substrate on which a lithium niobate film can be formed as an epitaxial film, and a sapphire single crystal substrate or a silicon single crystal substrate is preferable. The crystal orientation of the single crystal substrate is not particularly limited. The lithium niobate film has properties such as being easily formed as a c-axis-oriented epitaxial film with respect to single crystal substrates of various crystal orientations. Since the c-axis oriented lithium niobate film has triple symmetry, it is preferable that the single crystal substrate of the base also has the same symmetry. Thus, the sapphire single crystal substrate preferably has a c-plane, and the single crystal silicon substrate preferably has a (111) surface.

"Epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, it can be proved that the optical waveguide 2 is an epitaxial film by first measuring the peak intensity at the orientation position by 2θ-θ X-ray diffraction and second confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002) and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

It is desirable to form the lithium niobate film by a film forming method such as sputtering, CVD or sol-gel process. If the c-axis of the lithium niobate film is oriented perpendicular to the main surface of the substrate 1, an electric field is applied parallel to the c-axis, thereby changing the optical refractive index in proportion to the intensity of the electric field.

If the single-crystal substrate is sapphire, the lithium niobate film is formed by epitaxial growth directly at the sapphire single-crystal substrate. If the single-crystal substrate is silicon, the lithium niobate film is formed by epitaxial growth via a cladding layer (not shown). The cladding layer (not shown) is made of material which has a lower refractive index than the lithium niobate film and should be suitable for epitaxial growth.

As a formation method for the lithium niobate film, there is known a method of thinly polishing or slicing the lithium niobate single crystal substrate. This method is advantageous in that the same characteristics as the single crystal can be obtained and can be applied to the present invention.

As illustrated in FIG. 2, the first and second optical waveguides 10a and 10b respectively have two side surfaces 101 and 102 that are substantially perpendicular to the substrate 1. At least one of the side surfaces 101 and 102 has a rough surface. In other words, the rough surface can be formed on both side surfaces 101 and 102, and the rough surface can be also only formed on any one of the side surfaces 101 and 102.

The rough surface is formed to reduce the influence of stress caused by the difference in expansion coefficient between the lithium niobate film constituting the optical waveguide 2 and silicon oxide. Thereby the light propagation loss is reduced. The method of forming the rough surface is not particularly limited, and a known method can be used. Hereinafter, a method of forming rough surfaces on both side surfaces 101 and 102 of the first optical waveguide 10a by milling and anti-reagent patterning is described as an example.

The method of forming a rough surface by milling and anti-reagent patterning includes: a step of roughening the surface; a step of forming a anti-reagent layer on the surface; and a step of exposing the surface through a mask to remove the anti-reagent layer. The degree of roughness is defined by the maximum value Rmax of the roughness of the rough surface. The maximum value Rmax of roughness refers to the distance between the highest point (peak) and the lowest point (valley) of the surface contour within the specified length. In the optical modulator 100 of the present embodiment, the maximum value Rmax of the roughness of the two side surfaces 101 and 102 of the first and second optical waveguides 10a and 10b are preferably 8.6 to 55 nm, and more preferably 17 to 40 nm. By setting the maximum value Rmax of the roughness of the rough surface to be 8.6 to 55 nm, the light propagation loss can be suppressed to be small, and by setting the maximum value Rmax of the roughness of the rough surface to be 17 to 40 nm, the light propagation loss can be further suppressed to be smaller.

The maximum value Rmax of the roughness of the rough surface is measured by, for example, AFM (Atomic Force Microscope). The rough surface described above has 2 or more and 10 or less peaks in a field of view of 1.5 µm×0.2 µm. Thus, by forming a predetermined rough surface on the surface described above, the light propagation loss caused by the influence of stress on the optical waveguide due to difference of expansion coefficient between the lithium niobate film and silicon oxide is suppressed.

The pattern shape of the above-mentioned rough surface is not particularly limited, as long as it is a rough surface whose surface is uneven. For example, a plurality of protrusions may be formed, a plurality of dot-shaped depressions may be formed at random, or other patterns may be formed on the surfaces of the side surfaces 101 and 102 of the optical waveguides 10a and 10b. In this embodiment, the rough surfaces of the side surfaces 101 and 102 can be formed to have stripes. Herein, the "stripes" refers to uneven patterns in which a plurality of concave and convex portions are alternatively arranged. The pattern of stripes is preferably formed in an elongated shape in which the longitudinal direction of stripes intersects with the substrate, which is also referred to as a longitudinal stripe shape. Hereinafter, striped patterns are called ribs, horizontal striped patterns are called horizontal ribs, and longitudinal striped patterns are called longitudinal ribs.

In each of the above roughening patterns, comparing with horizontal ribs or random roughness, the longitudinal rib shape is the best way to obtain the optimal pattern representation method with a specific roughness in such a way that the frequency of peaks collectively appears in a predetermined field of view. It is because that, for a lithium niobate film with an optical waveguide of 2.0 µm or less, the longitudinal ribs can ensure that there are 2 peaks or more and 10 peaks or less in the field of view of 1.5 µm×0.2 µm, and the number of the peaks repeatedly appears continuously at predetermined intervals. However, the horizontal ribs or random roughness can only have about 0 to 1 peak in a predetermined field of view. Therefore, in order to obtain the roughness with a constant frequency of appearance of peaks, the roughening pattern is most preferably in the shape of longitudinal ribs. By forming the rough surface with a longitudinal rib shape on the two side surfaces 101 and 102 of the first optical waveguide 10a, the light propagation loss caused by the influence of stress on the optical waveguide due to difference of expansion coefficient between the lithium niobate film and silicon oxide is suppressed.

Figure 3:
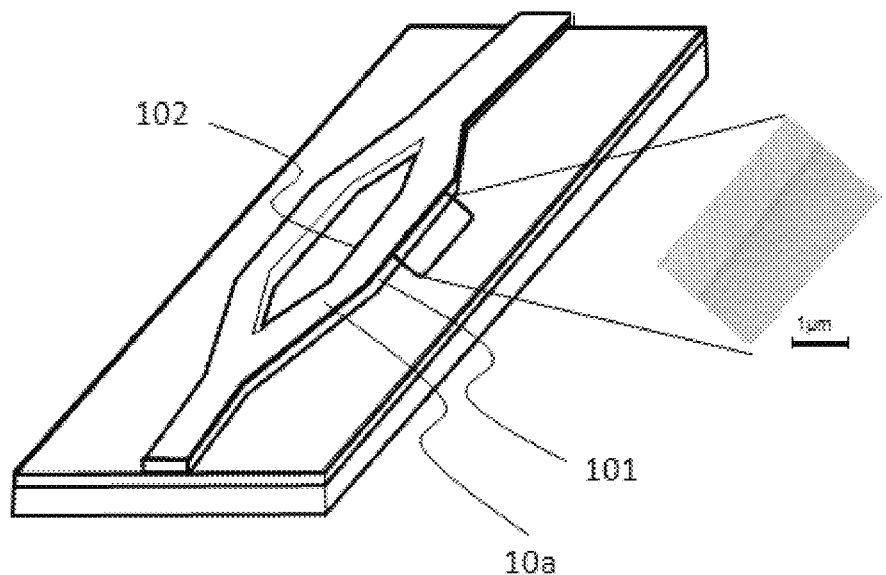
FIG. 3 is a photograph of the rough surface of one side surface 101 of the lithium niobate film of the first optical waveguide 10a of the Mach-Zehnder optical waveguide 10 observed by SEM.

FIG. 3 shows the Mach-Zehnder optical waveguide 10 of the optical waveguide 2 and the result of observing the state of the side surface 101 of the Mach-Zehnder optical waveguide 10 by a scanning electron microscope (SEM). The side surface 101 of the first optical waveguide 10a of the Mach-Zehnder optical waveguide 10 observed by SEM is a rough surface. On the observed side surface, a rough surface with longitudinal ribs is formed, which is significantly different from the surface state of a conventional flat electro-optical material film (not shown) in which the rough surface is not formed. By forming the side surface of the optical waveguide 2 to have such a rough surface with longitudinal ribs, the effect of suppressing the light propagation loss possessed by the optical waveguide 2 of the present embodiment can be obtained. Here, only the side surface 101 of the first optical waveguide 10a of the Mach-Zehnder optical waveguide 10 observed by SEM is illustrated. Actually, at least one side surface of the optical waveguide 2 observed by SEM may be a rough surface with longitudinal ribs as shown in FIG. 3.

Figure 4:
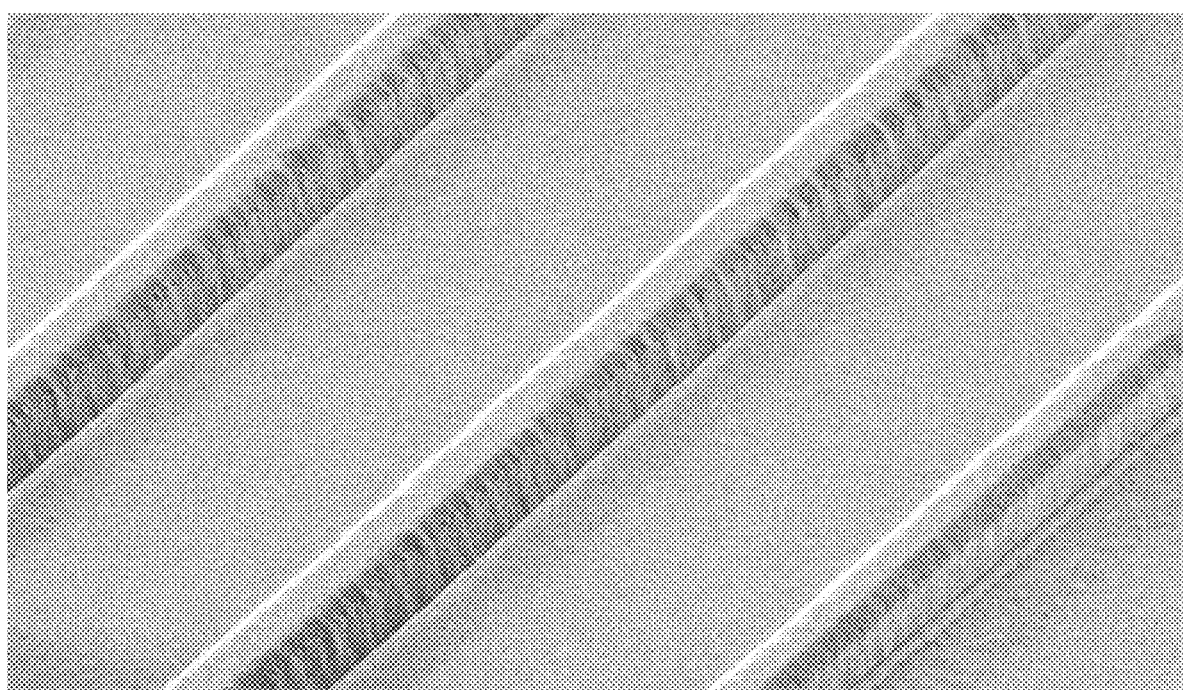
FIG. 4 is an expanded view of the SEM photograph of the longitudinal ribs provided on the rough surface shown in FIG. 3.

FIG. 4 is an expanded view of the SEM photograph of the longitudinal ribs provided on side surface 101.

In addition, the method of forming the rough surface on the side surface of the lithium niobate film as the optical waveguide 2 is not limited to the above method, and the rough surface can be formed by, for example, laser etching, metal mask patterning, and RIE etching. Specifically, in the method of forming the rough surface using a laser, the surfaces of the two side surfaces 101 and 102 of the lithium niobate film serving the optical waveguide 2 are irradiated with a laser beam and scanned back and forth, and the scanning direction is the same as the direction of the light propagation. The scanning direction runs along the side surface of the optical waveguide 2. Thereby elongated longitudinal ribs are formed in the direction intersecting the substrate. Metal mask patterning and RIE etching are methods of forming metal mask patterns on the surfaces of both side surfaces 101 and 102 of the lithium niobate film as the optical waveguide 2 and performing RIE etching. RIE (Reactive Ion Etching) is a kind of dry etching. The principle of RIE etching is that when a high frequency voltage (RF: radio frequency) of 10 to 100 MHZ is applied between the plate electrodes, an ion sheath with a thickness of hundreds of microns, in which the sample is placed, and the ions hit the sample at high speed to complete the chemical reaction etching.

In addition, as long as a rough surface can be formed on at least one side surface of the lithium niobate film, it is not limited to any method, and any method can be used.

EXAMPLE

The light propagation loss is compared for the optical modulator 100 having the cross-sectional structure of the optical waveguide 2 shown in FIG. 2 with different roughness Rmax. As examples, only the roughness Rmax is changed, and other structures are the same. The roughness parameters and evaluation results of each example are illustrated in Table 1.

TABLE 1

|  | Roughness Rmax (nm) | Light propagation loss (dB) |
| --- | --- | --- |
| Example 1 | 6.7 | 16.0 |
| Example 2 | 8.6 | 10.4 |
| Example 3 | 17.0 | 8.4 |
| Example 4 | 20.0 | 8.5 |
| Example 5 | 20.0 | 8.1 |
| Example 6 | 27.0 | 8.1 |
| Example 7 | 30.0 | 6.0 |
| Example 8 | 33.0 | 7.8 |
| Example 9 | 40.0 | 7.2 |
| Example 10 | 55.0 | 10.5 |
| Example 11 | 60.0 | 19.0 |

As illustrated in Table 1, by setting the roughness Rmax to be 8.6 to 55 nm, the light propagation loss is 10.5 dB or less, and the light propagation loss can be suppressed to be small. By setting the roughness Rmax to be 17 to 40 nm, the light propagation loss is 8.4 dB or less, and the light propagation loss can be further suppressed to be smaller.

Although the present invention has been specifically described above with reference to the accompanying drawings and examples, it can be understood that the above description does not limit the present invention in any form. For example, in the above description of the optical modulator 100, it is described that the first electrode is the jump electrode and the second electrode is the ground electrode. However, it is not limited to this, the first and second electrodes can be any electrode that applies an electric field to the optical waveguide. For example, the first electrode can be a signal electrode, and the second electrode can be a ground electrode. Since the optical modulator is so-called single-driving type provided with one signal electrode, and the signal electrode as the first electrode and the ground electrode as the second electrode have symmetrical structures, so the electric fields applied to the first and second optical waveguides are equal in magnitude and opposite in sign. In addition, the embodiments of the present invention can be also suitable for various devices without electrodes. In addition, for example, in the above description of the light modulator 100, both the side surfaces 101 and 102 of the first optical waveguide 10a have rough surfaces, but it is not limited to this, and it can be also that only one surface of the side surface 101 or the side surface 102 has a rough surface.

In addition, in the above embodiment, the optical waveguide 2 is formed as a raised ridge at the surface of the substrate 1, but the formation of the optical waveguide 2 is not limited to this, it is also possible to implant ions into the substrate to form an optical waveguide, for example, doping Ti in a lithium niobate single crystal substrate to form an optical waveguide 2, and these modifications are also included in this embodiment.

In addition, in the above embodiments, an example that an optical modulator containing electrodes is given, but of course, the present invention can also be applied to an optical device provided only with optical waveguides but without electrodes, and the present invention can be also applied to arbitrary optical device which can achieve optical communication or optical measurement such as an optical switch, an optical resonator, an optical branch circuit, a sensor element, a millimeter wave generator etc. In the case of applying the present invention to an electro-optical device having an electro-optical effect film, the optical waveguide can be replaced by the electro-optical effect film. Those skilled in the art can make modifications and changes to the present invention as required without departing from the essential spirit and the scope of the present invention, and these modifications and changes all fall within the scope of the present invention.

DESCRIPTION OF REFERENCE NUMERALS 1 substrate
2 optical waveguide
3 protective layer
4 electrode layer
7 first electrode
8 second electrode
10 Mach-Zehnder optical waveguide
10a first optical waveguide
10b second optical waveguide
10c demultiplexing section
10d multiplexing section
10i input optical waveguide
10o output optical waveguide
101 one side surface
102 other side surface

The invention claimed is:

1. An optical device comprising:
a substrate;
an optical waveguide formed at the substrate; and
a protective layer formed adjacent to the optical waveguide,
wherein:
the optical waveguide comprises multiple side surfaces that intersect the substrate,
at least one side surface of the optical waveguide is provided with a rough surface, and
a maximum value Rmax of the roughness of the rough surface is in a range of 8.6 to 55 nm.

2. The optical device according to claim 1, wherein the maximum value Rmax of the roughness of the rough surface is in a range of 17 to 40 nm.

3. The optical device according to claim 1, wherein in the rough surface, there are 2 or more peaks in a field of view of 1.5 μm×0.24 μm.

4. The optical device according to claim 1, wherein the rough surface is provided with ribs in a direction intersecting the substrate.

5. The optical device according to claim 4, wherein the ribs are longitudinal ribs.

6. The optical device according to claim 1, wherein the optical waveguide is a film composed of $LiNbO_3$ or $LiTaO_3$.

7. The optical device according to claim 1, wherein the optical waveguide is a film in which $LiNbO_3$ is doped with at least one element selected from Ti, Mg, Zn, In, Sc, Er, Tm, Yb, and Lu.

8. The optical device according to claim 1, wherein the optical waveguide is an epitaxial film.

9. The optical device according to claim 8, wherein the epitaxial film is oriented in a direction intersecting the substrate.

10. The optical device according to claim 1, further comprising an electrode arranged on an opposite side of a ridge portion of the optical waveguide from the substrate, the ridge portion protruding from a surface of the optical waveguide in a direction away from the substrate.

11. An optical modulator comprising:
a substrate;
an optical waveguide formed at the substrate;
a protective layer formed adjacent to the optical waveguide; and
an electrode formed at the optical waveguide via the protective layer,
wherein:
the optical waveguide comprises multiple side surfaces that intersect the substrate,
at least one side surface of the optical waveguide is provided with a rough surface, and
a maximum value Rmax of the roughness of the rough surface is in a range of 8.6 to 55 nm.

12. The optical device according to claim 11, wherein the maximum value of the roughness of the rough surface Rmax is 17 to 40 nm.

13. The optical modulator according to claim 11, wherein the electrode is arranged on an opposite side of a ridge portion of the optical waveguide from the substrate, the ridge portion protruding from a surface of the optical waveguide in a direction away from the substrate.

\* \* \* \* \*